United States Patent
Tsujimoto et al.

(10) Patent No.: US 9,592,965 B2
(45) Date of Patent: Mar. 14, 2017

(54) CONVEYING APPARATUS AND CONVEYING METHOD

(71) Applicant: Daifuku Co., Ltd., Osaka-shi, Osaka (JP)

(72) Inventors: Kazushi Tsujimoto, Shiga (JP); Shinji Inatomi, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 15/070,031

(22) Filed: Mar. 15, 2016

(65) Prior Publication Data
US 2016/0280469 A1  Sep. 29, 2016

(30) Foreign Application Priority Data
Mar. 27, 2015 (JP) .................. 2015-065399

(51) Int. Cl.
| | |
|---|---|
| *B65G 47/31* | (2006.01) |
| *B65G 43/10* | (2006.01) |
| *B65G 47/52* | (2006.01) |

(52) U.S. Cl.
CPC ............. *B65G 43/10* (2013.01); *B65G 47/52* (2013.01); *B65G 47/31* (2013.01)

(58) Field of Classification Search
CPC ......... B65G 47/31; B65G 43/10; B65G 43/08
USPC ......... 198/419.2, 461.1, 461.2, 461.3, 462.1, 198/460.1, 464.1
See application file for complete search history.

(56) References Cited

U.S. PATENT DOCUMENTS

| | | | | |
|---|---|---|---|---|
| 3,485,339 | A | * 12/1969 | Miller ................... | B65G 43/08 198/460.1 |
| 3,827,545 | A | 8/1974 | Buhayar ................. | 198/34 |
| 4,629,058 | A | * 12/1986 | Reissmann ........ | B65H 31/3054 198/461.1 |
| 5,097,939 | A | * 3/1992 | Shanklin ............... | B65G 47/31 198/419.2 |

(Continued)

FOREIGN PATENT DOCUMENTS

| | | | | |
|---|---|---|---|---|
| JP | 61-206719 | 9/1986 | ............. | B65G 47/31 |
| JP | 9-323810 | 12/1997 | ............. | B65G 33/02 |

OTHER PUBLICATIONS

Extended European Search Report from corresponding European Patent Application No. 16000577.3, dated Aug. 24, 2016.

*Primary Examiner* — James R Bidwell
(74) *Attorney, Agent, or Firm* — Kusner & Jaffe

(57) ABSTRACT

A conveying apparatus that increases the conveying speed of a conveyance object, and improves reliability and conveyance efficiency at low cost. Acceleration/deceleration sections, each of which includes a plurality of variable-speed conveyance sections, are provided among constant-speed conveyance sections. The conveying speed of a conveyance object is continuously accelerated or decelerated while the conveyance object passes through the acceleration/deceleration sections. This changes the conveying speed from the conveying speed of the upstream constant-speed conveyance section to the conveying speed of the downstream constant-speed conveyance section. Thus, it is controlled that the conveying speed and the conveyance acceleration/deceleration is identical between the upstream conveyance section and the downstream conveyance section when the conveyance object is transferred from the upstream conveyance section to the downstream conveyance section.

7 Claims, 6 Drawing Sheets

(56) References Cited

U.S. PATENT DOCUMENTS

| | | | | |
|---|---|---|---|---|
| 6,763,931 B1* | 7/2004 | Brehm | ............... | B65G 43/10 198/460.1 |
| 7,413,071 B2* | 8/2008 | Zeitler | ............... | B65G 43/08 198/460.1 |
| 7,793,772 B2* | 9/2010 | Schafer | ............ | B65G 47/261 198/460.1 |
| 7,938,247 B2* | 5/2011 | Kujat | ................. | B65G 47/31 198/461.1 |
| 8,596,446 B2* | 12/2013 | Biggel | .............. | B65B 35/246 198/419.2 |
| 2009/0114508 A1* | 5/2009 | Hara | .................. | B65G 43/08 198/461.1 |
| 2013/0213768 A1* | 8/2013 | Yokoya | .............. | B65G 43/10 198/462.1 |
| 2014/0156061 A1* | 6/2014 | Neiser | .............. | B65G 47/268 198/462.1 |

\* cited by examiner

CONVEYING APPARATUS AND CONVEYING METHOD

FIELD OF THE INVENTION

The present invention relates to a conveying apparatus for conveying a conveyance object in a conveying direction, and a conveying method.

BACKGROUND OF THE INVENTION

Conventionally, conveying apparatuses for conveyance objects such as baggage to destinations have been available. For example, in an airport, an airport baggage conveying apparatus is used to convey the baggage of passengers to a loading area close to a passenger plane to be boarded by the passengers.

Regarding such an airport baggage conveying apparatus, a large airport, for example, a hub airport having an extended area leads to an extremely long distance from a location for checking the baggage of passengers in a check-in counter to a location where the intended plane is stopped (or a loading area near the location) and a large number of pieces of baggage. Thus, in order to deliver all the baggage to the plane within a limited time before the plane takes off, a conveying speed for the baggage needs to be increased.

As a conventional method of conveying objects such as baggage with high velocity, FIG. 6 shows a conveying method through a conveyance path including a plurality of conveyors (e.g., a belt conveyor or a wheel conveyor). A conveyance object 90 on the conveyance path is first placed on a tray 99 on a first conveyor 91 disposed on the extreme upstream end of the path. The first conveyor 91 conveys the tray 99 bearing the conveyance object 90 with a constant low conveying speed. A second conveyor 92 with a constant speed higher than that of the first conveyor 91 is disposed downstream of the first conveyor 91. Moreover, a plurality of conveyors (with constant speeds) including a high-speed third conveyor 93 and a higher-speed fourth conveyor 94 are provided in series downstream of the second conveyor 92 so as to sequentially increase in conveying speed. The tray 99 bearing the conveyance object 90 is sequentially transferred to these conveyors so as to gradually increase a conveying speed for the conveyance object 90. This can increase the conveying speed of the overall conveyance path. In an area near a destination (e.g., a plane to carry passengers), a plurality of conveyors are provided in series so as to sequentially decrease in conveying speed contrary to the above sequential increase in conveying speed. The tray 99 bearing the conveyance object 90 is sequentially transferred to these conveyors with gradual deceleration.

Japanese Patent Laid-Open No. 9-323810 discloses, as related art, such a conventional conveying apparatus with gradual acceleration and deceleration.

In the gradual acceleration/deceleration method as described above, however, the conveying speed rapidly changes when the tray 99 is transferred to another conveyor. Thus, the conveyance object 90 on the tray 99 receives an inertial force caused by a conveyance acceleration (a change of the conveying speed). When a suitcase is conveyed as passenger's baggage in an airport baggage conveying apparatus, such an inertial force may cause an impact to the content of the suitcase or shift the position of the suitcase on the tray 99. Thus, passengers' baggage may be insufficiently maintained or less smoothly conveyed.

For example, in the case of a belt conveying apparatus, when the conveying speed rapidly changes during the transfer of the tray 99 over the conveyors, a slip may occur between the tray 99 and the belts of the conveyors. Thus, repeated conveyance may wear the belts and the tray.

In order to solve the above problems, in the invention of Japanese Patent Laid-Open No. 9-323810, a conveyor shaft having a spiral groove is rotated with a returnable case engaged with the spiral groove, achieving continuous acceleration and deceleration.

However, if such a configuration is installed in an extended area of a large airport, the conveyor shaft having the spiral groove, which is a member for the configuration, needs to be provided over a long path. Moreover, the returnable case needs to be specially designed for engagement with the spiral groove. This may extremely increase the introduction cost. Furthermore, the complicated configuration leads to low reliability and difficulty in maintenance. During acceleration of the returnable case using the conveyor shaft, the subsequent returnable case cannot be transported from upstream of the conveyor shaft to the section of the conveyor shaft. The subsequent returnable case cannot be transported to the section of the conveyor shaft until the preceding returnable case has been transported to finish acceleration and then the conveyor shaft is decelerated to the original speed. Thus, the conveyance efficiency cannot be sufficiently improved.

An object of the present invention is to provide a conveying apparatus that increases the conveying speed of a conveyance object over an overall conveyance path without causing an impact and a displacement of the conveyance object, and sufficiently improves reliability conveyance efficiency at low cost.

SUMMARY OF THE INVENTION

In order to solve the problems, a conveying apparatus of the present invention is a conveying apparatus for conveying a conveyance object, the conveying apparatus having a conveyance path along a conveying direction of the conveyance object, the conveyance path including a plurality of conveyance sections provided along the conveying direction, the conveyance object being conveyed through the conveyance path, wherein at least two of the conveyance sections are constant-speed conveyance sections each of which conveys the conveyance object with a constant conveying speed, each of the constant-speed conveyance sections having its constant conveying speed predetermined corresponding to each of the constant-speed conveyance sections, an upstream constant-speed conveyance section being one of the constant-speed conveyance sections disposed in the upstream side in the conveying direction, a downstream constant-speed conveyance section being another one of the constant-speed conveyance sections disposed in the downstream side in the conveying direction, the upstream constant-speed conveyance section and the downstream constant-speed conveyance section having different conveying speeds from each other, the conveyance path includes an acceleration/deceleration section between the upstream constant-speed conveyance section and the downstream constant-speed conveyance section, the acceleration/deceleration section including a plurality of variable-speed conveyance sections capable of changing a conveying speed of the conveyance object, each of the variable-speed conveyance sections included in the acceleration/deceleration section has a conveying speed that is continuously accelerated or decelerated during the conveyance of the conveyance object, while the conveyance object is passing through the entire acceleration/deceleration section, the conveying speed of the conveyance object being accelerated or decelerated from the conveying speed of the upstream constant-speed conveyance section to the conveying speed of the downstream constant-speed conveyance section, the conveying speed and the conveyance acceleration/deceleration are controlled to be identical between an upstream conveyance section conveying the conveyance object and a downstream conveyance section disposed in the downstream side of the upstream conveyance section when the conveyance object is transferred from the upstream conveyance section to the downstream conveyance section, and after the conveyance object is conveyed to the downstream conveyance section, a conveying speed of the variable-speed conveyance section disposed in the upstream side is accelerated or decelerated so as to approach a conveying speed of the upstream constant-speed conveyance section.

According to the conveying apparatus, when the conveyance object is transferred from specific one of the conveyance sections to the subsequent conveyance section, a conveying speed and a conveyance acceleration/deceleration do not rapidly change. Thus, the conveyance object does not receive an inertial force caused by a rapid speed change. The conveyance sections constituting the conveyance path may be ordinary conveyors with ensured reliability (actual operations) as long as such control is performed.

Moreover, the conveying speed is continuously accelerated or decelerated while the conveyance object is conveyed on each of the variable-speed conveyance sections in the acceleration/deceleration section. Thus, the conveyance object can reach the conveying speed of the downstream constant-speed conveyance section in a short time at a short distance. This can reduce the length and the number of variable-speed conveyance sections included in the acceleration/deceleration section. This allows the constant-speed conveyance sections that are installed and operated at low cost because of the simple mechanisms for constant-speed conveyance to mostly cover the conveyance path.

Furthermore, the acceleration/deceleration section includes the variable-speed conveyance sections. And the upstream variable-speed conveyance section transfers the conveyance object downstream of the same and then returns to the original conveying speed. Thus, while the conveyance object is conveyed and is accelerated or decelerated in the acceleration/deceleration section, the subsequent object can be conveyed to the variable-speed conveyance section having returned to the original speed. This eliminates the need for waiting for the completion of conveyance through the acceleration/deceleration section, thereby sufficiently improving conveyance efficiency.

In addition to the above feature, the conveying apparatus according to the present invention may be characterized as follows: the conveyance path contains acceleration/deceleration reference positions set for the respective variable-speed conveyance sections, transfer control is performed after the conveyance object reaches the acceleration/deceleration reference position, and in the transfer control, the variable-speed conveyance section for the acceleration/deceleration reference position has a conveying speed that is accelerated or decelerated with a predetermined transfer acceleration/deceleration.

According to the conveying apparatus having this feature, the conveying speed can be controlled in the relatively simple step of starting acceleration/deceleration with the predetermined acceleration/deceleration when the conveyance object reaches the predetermined position. This facilitates the construction and introduction of the conveying apparatus.

In addition to the features, the conveying apparatus according to the present invention a reference speed is set for each of the variable-speed conveyance sections, and the reference speed, the acceleration/deceleration reference position, and the transfer acceleration/deceleration may be set to satisfy the following condition:

the transfer control is performed such that the conveyance object reaches the acceleration/deceleration reference position and then the conveying speed of the variable-speed conveyance section corresponding to the acceleration/deceleration reference position is accelerated or decelerated with a constant transfer acceleration/deceleration from the reference speed, allowing the conveying speed of the variable-speed conveyance section to be identical to the conveying speed of a conveyance section upstream of the variable-speed conveyance section when the conveyance object reaches the variable-speed conveyance section.

According to this design, the conveying speeds of the upstream and downstream conveyance sections can be controlled to be equalized during the transfer of the conveyance object in the relatively simple step of accelerating or decelerating the conveying speed of the variable-speed conveyance section corresponding to the acceleration/deceleration reference position with a constant conveyance acceleration/deceleration when the conveyance object reaches the acceleration/deceleration reference position. This facilitates the construction and introduction of the conveying apparatus.

In addition to the above features, the conveying apparatus according to the present invention may be characterized as follows: when the conveyance object in the variable-speed conveyance section is transferred to a conveyance section downstream of the variable-speed conveyance section, speed recovery control is performed, and in the speed recovery control, the variable-speed conveyance section has a conveying speed that is accelerated or decelerated to the reference speed with a recovery acceleration/deceleration having an absolute value larger than the transfer acceleration/deceleration.

According to the conveying apparatus having the feature, the variable-speed conveyance section transfers the conveyance object to the downstream conveyance section of the same and then returns to the reference speed in a shorter period than the conveyance period of the conveyance object in the variable-speed conveyance section. Thus, the subsequent article can be transferred to the conveyance section earlier, improving the conveyance efficiency.

In addition to the above features, the conveying apparatus according to the present invention may be characterized as follows: a plurality of containers to be conveyed of uniform shapes are conveyed in the conveyance path by conveyors, and the conveyance object is conveyed while being stored in the container to be conveyed in each of the conveyance sections.

According to the conveying apparatus having the feature, the containers to be conveyed of uniform shapes are directly conveyed by the conveyors. Thus, set values for the performance and control of devices used for conveyance can be determined beforehand with respect to the shapes of the containers to be conveyed without need for consideration of the shapes of the individual conveyed articles. This facilitates the construction and introduction of the conveying apparatus.

In the conveying apparatus according to the present invention, the above container to be conveyed has an inverted taper portion where dimensions along the conveying direction are extended upward from the bottom of the container to be conveyed.

According to the design, the bottom of the container to be conveyed has smaller dimensions than the upper part of the container to be conveyed along the conveying direction. Thus, even if the upper part of the conveyed contained has large dimensions for articles of various shapes, the bottom of the container to be conveyed can have smaller dimensions in direct contact with the conveyors of the conveyance sections. Thus, during transfer between the conveyance sections, the overall weight of the conveyance object and the container to be conveyed can be more quickly transferred to the downstream conveyance section, improving the conveyance efficiency.

A conveying method according to the present invention is a conveying method for conveyance object, the conveyance object being conveyed through a conveyance path including a plurality of conveyance sections provided along the conveying direction of the conveyance object, wherein at least two of the conveyance sections are constant-speed conveyance sections each of which conveys the conveyance object with a predetermined constant conveying speed, the constant-speed conveyance sections including an upstream constant-speed conveyance section disposed in the upstream side and a downstream constant-speed conveyance section disposed in the downstream side in the conveying direction with different conveying speeds, the conveyance path includes an acceleration/deceleration section between the upstream constant-speed conveyance section and the downstream constant-speed conveyance section, the acceleration/deceleration section including a plurality of variable-speed conveyance sections capable of changing the conveying speed of the conveyance object, in each of the variable-speed conveyance sections included in the acceleration/deceleration section, the method includes: continuously accelerating or decelerating the conveying speed of the variable-speed conveyance section during the conveyance of the conveyance object so as to accelerate or decelerate the conveying speed of the conveyance object while the conveyance object is passing through the entire acceleration/deceleration section, from the conveying speed of the upstream constant-speed conveyance section to the conveying speed of the downstream constant-speed conveyance section; controlling the conveying speed and the conveyance acceleration/deceleration to be identical between an upstream conveyance section conveying the conveyance object and a downstream conveyance section disposed in the downstream side of the upstream conveyance section when the conveyance object is transferred from the upstream conveyance section to the downstream conveyance section; and after the conveyance object is conveyed to the downstream conveyance section, accelerating or decelerating the conveying speed of the variable-speed conveyance section disposed upstream so as to approach the conveying speed of the upstream constant-speed conveyance section.

According to the conveying method, when the conveyance object is transferred from specific one of the conveyance sections to the subsequent conveyance section, the conveying speed and the conveyance acceleration/deceleration do not rapidly change. Thus, the conveyance object does not receive an inertial force caused by a rapid speed change.

According to the present invention, the conveyance object does not receive an inertial force and thus an impact is not applied to the conveyance object during transfer. Moreover, the position of the conveyance object during transfer is not displaced. This can sufficiently achieve maintenance and smooth conveyance for the conveyance object. Moreover, each of the conveyance sections can have a simple configuration including reliable devices. This does not lead to high introduction cost unlike the conventional conveying apparatus, facilitating the maintenance.

DETAILED DESCRIPTION OF THE INVENTION

Referring to FIGS. 1 to 5, an embodiment of a conveying apparatus according to the present invention will be described below.

[Conveyance Path]

Figure 1:
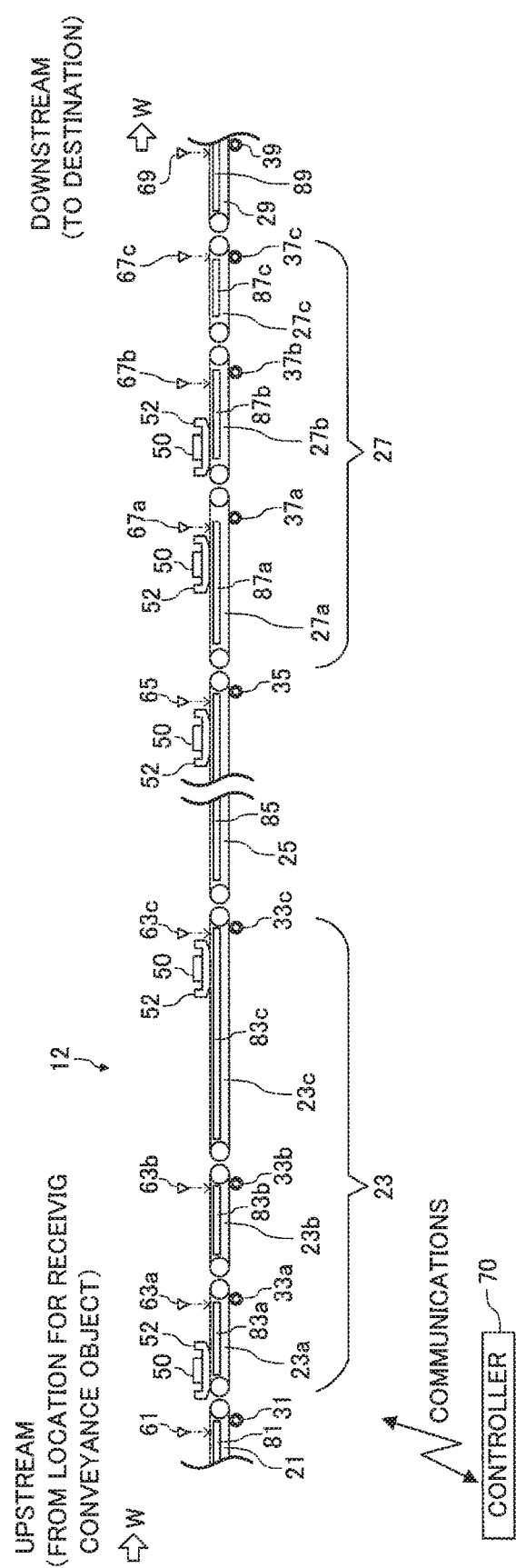
FIG. 1 is a schematic side view showing a conveying apparatus as an embodiment of the present invention.

FIG. 1 is a side view schematically showing a conveying apparatus 10 as an embodiment of the present invention. The conveying apparatus 10 includes a conveyance path 12 extended along a conveying direction W toward a destination (e.g., a plane on standby of boarding). The conveyance path 12 is composed of conveyance sections 21, 23, 25, 27, and 29.

Of the conveyance sections 21, 23, 25, 27, and 29, the upstream low-speed section 21 serving as a constant-speed conveyance section for constant-speed conveyance is located on the extreme upstream end of FIG. 1. Moreover, variable-speed conveyance sections 23a, 23b, and 23c are provided downstream of the upstream low-speed section 21 so as to change a conveying speed. The variable-speed conveyance sections 23a, 23b, and 23c (sequentially referred to as a first acceleration section 23a, a second acceleration section 23b, and a third acceleration section 23c from the upstream side) are disposed in series to constitute the acceleration section 23 (one of an acceleration/deceleration part). The high-speed section 25 is disposed downstream of the acceleration section 23 as a constant-speed conveyance section for conveyance with a constant speed higher than that of the upstream low-speed section 21.

Moreover, variable-speed conveyance sections 27a, 27b, and 27c (sequentially referred to as a first deceleration section 27a, a second deceleration section 27b, and a third deceleration section 27c from the upstream side) that can change a conveying speed are disposed in series downstream of the high-speed section 25 so as to constitute the deceleration section 27 (an acceleration/deceleration part). The downstream low-speed section 29 is provided downstream of the deceleration section 27 as a constant-speed conveyance section for conveyance with a constant speed lower than that of the high-speed section 25.

The above upstream low-speed section 21, the high-speed section 25, and the downstream low-speed section 29 each include a belt conveyor and are driven to convey articles with a predetermined constant speed by motors 31, 35, and 39 serving as driving sources.

The acceleration section 23 and the deceleration section 27 also include belt conveyors. In the variable-speed conveyance sections 23a, 23b, 23c, 27a, 27b, and 27c included in the acceleration section 23 and the deceleration section 27, the belt conveyors are driven by motors 33a, 33b, 33c, 37a, 37b, and 37c, respectively. The conveying speeds of the belt conveyors can be changed by controlling the rotations of the respective corresponding motors.

A reference speed is set for the belt conveyors of the acceleration section 23 and the deceleration section 27. When conveyance objects are not conveyed, the belt conveyors operate with a constant reference speed set for the belt conveyors.

The motors 31, 35, and 39 and the motors 33a, 33b, 33c, 37a, 37b, and 37c communicate with a controller 70, which will be discussed later, via wired or wireless communications (cable connection via an interface circuit or electromagnetic communications). The controller 70 controls device operations in the conveying apparatus 10.

[Conveyor Tray]

Figure 2:
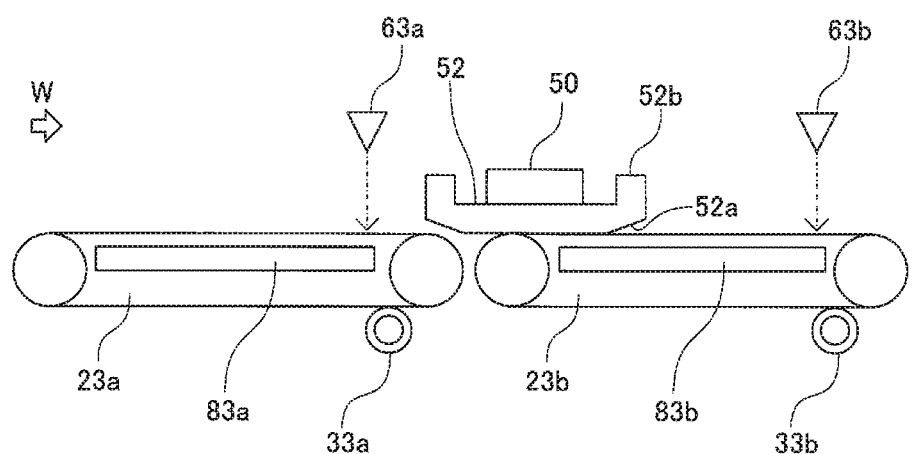
FIG. 2 shows an aspect of transfer of a conveyor tray and a conveyance object from a first acceleration section to a second acceleration section in the conveying apparatus as the embodiment of the present invention.

A conveyance object 50 (e.g., a piece of baggage) to be conveyed in the conveying apparatus 10 is conveyed through the conveyance sections while being placed on the top surface of a conveyor tray 52 that serves as a container to be conveyed that is conveyed on the belt conveyors. In other words, the conveyance object 50 is conveyed while being stored in the container to be conveyed. As shown in FIG. 2, the conveyor tray 52 has an inverted taper portion 52a at the bottom where dimensions along the conveying direction W are extended upward from the bottom. Thus, the lower part of the conveyor tray 52 is shaped like an inverted trapezoid in side view. The top surface of the conveyor tray 52 bearing the conveyance object 50 is larger than the average size of the conveyance object 50 so as to store the conveyance object 50 of various shapes. In FIG. 2, the top surface of the conveyor tray 52 is almost twice as large as the average size of the conveyance object 50 in the conveying direction W (note that all of the conveyance object 50 in FIG. 2 have a medium size, but the large conveyance object 50 almost as large as the top surface of the conveyor tray 52 may be conveyed in some cases). Moreover, the outer end of the top surface of the conveyor tray 52, particularly along the conveying direction W, has an end protrusion 52b that is extended slightly higher than a mounting surface for the conveyance object 50 in order to prevent the conveyance object 50 from slipping from the top surface of the conveyor tray 52.

[Arrival Sensor]

For example, at multiple predetermined positions (e.g., acceleration/deceleration reference positions) set in the conveyance path 12, a sensor is provided to detect arrival of the conveyance object 50 (the conveyor tray 52 bearing the conveyance object 50) at the positions. In the present embodiment, such a sensor is provided for each of the conveyance sections. For example, arrival sensors 63a, 63b, and 63c, each of which includes a photoreflector and a photoelectric sensor such as a photoelectric baggage sensor (PHS), are disposed substantially upstream of the downstream ends of the acceleration sections 23a, 23b, and 23c of the acceleration section 23. The upstream low-speed conveyance section 21, the high-speed section 25, the deceleration section 27, and the downstream low-speed section 29 also include arrival sensors 61, 65, 67a, 67b, 67c, and 69 at predetermined positions.

In a specific mounting method of the arrival sensors, for example, a photoreflector may be disposed on a pedestal attached to the side of the belt conveyor such that light is emitted to the transported conveyor tray 52. The installation of the arrival sensors is not limited as long as the arrival of the conveyance object 50 at a specific position can be detected.

The arrival sensors 61, 63a, 63b, 63c, 65, 67a, 67b, 67c, and 69 transmit signals indicating detection results to the controller 70, which will be described later, through wired or wireless communications.

[Weight Sensor]

The conveyance sections 21, 23a, 23b, 23c, 25, 27a, 27b, 27c, and 29 include weight sensors 81, 83a, 83b, 83c, 85, 87a, 87b, 87c, and 89 for detecting the weight of an object conveyed in the conveyance sections. For example, the weight sensors may be gage sensors disposed below the conveyance surfaces of the conveyance sections.

The weight sensors 81, 83a, 83b, 83c, 85, 87a, 87b, 87c, and 89 transmit signals indicating detection results to the controller 70, which will be described later, through wired or wireless communications.

[Controller]

The controller 70 can determine a status in the conveying apparatus 10 in response to signals received from devices communicating with the controller 70 and data inputted by a user and can control the operations of the devices in the conveying apparatus 10. For example, the controller 70 may include a processor or computer that executes a program for determining what data to be outputted in response to inputted data (with what manner the various devices should be operated) or a PLC that is predetermined in performing what operations under what conditions. In the present embodiment, the controller 70 is a computer installed away from the conveyance path 12.

Figure 3:
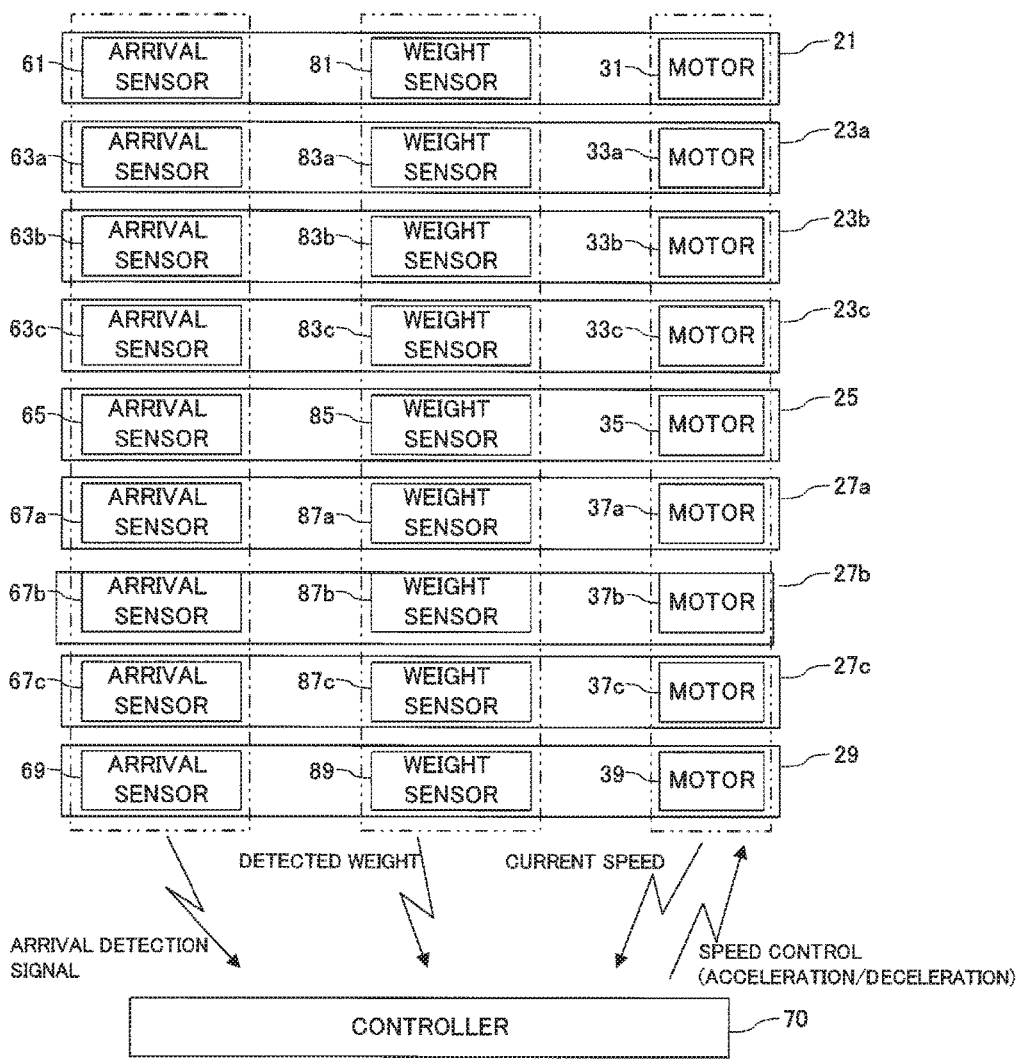
FIG. 3 is a block diagram showing the relationship between devices in the conveying apparatus as the embodiment of the present invention.

In the present embodiment, as shown in FIG. 3, the controller 70 is connected so as to communicate with the arrival sensors 61, 63a, 63b, 63c, 65, 67a, 67b, 67c, and 69, the weight sensors 81, 83a, 83b, 83c, 85, 87a, 87b, 87c, and 89, and the motors 31, 33a, 33b, 33c, 35, 37a, 37b, 37c, and 39 through wired or wireless communications.

The controller 70 can determine whether the conveyance object 50 (the conveyor tray 52 bearing the conveyance object 50) has reached the acceleration/deceleration reference positions on the conveyance path 12 or not based on the signals from the arrival sensors 61, 63a, 63b, 63c, 65, 67a, 67b, 67c, and 69.

Moreover, the controller 70 can determine the completion of transfer, specifically, whether the conveyance object 50 has been completely transferred to the conveyance sections (without being located between the conveyance sections) or not based on a weight increase or reduction detected by the weight sensors 81, 83a, 83b, 83c, 85, 87a, 87b, 87c, and 89. Specifically, while a weight detected by the weight sensor increases, the controller 70 can determine that the conveyance object 50 is being transferred to the conveyance section corresponding to the weight sensor. If a detected weight stops increasing, the controller 70 can determine that the conveyance object 50 has been completely transferred to the conveyance section. While a detected weight decreases, the controller 70 can determine that the conveyance object 50 is being transferred from the corresponding conveyance section to the downstream conveyance section.

The controller 70 controls the rotations of the motors 33a, 33b, 33c, 37a, 37b, and 37c so as to adjust the conveying speeds of the belt conveyors in the variable-speed conveyance sections 23a, 23b, 23c, 27a, 27b, and 27c. Moreover, the controller 70 can recognize current conveying speeds in the variable-speed conveyance sections based on the rotational states of the motors. Furthermore, the controller 70 can stop all of the motors 31, 33a, 33b, 33c, 35, 37a, 37b, 37c, and 39 so as to suspend conveyance in case of emergency, e.g., a failure of the conveying apparatus 10.

[Article Conveyance]

How the conveyance object 50 on the conveyance path 12 is conveyed will be discussed below.

First, the conveyance object 50 (e.g., baggage) is received in a location for receiving the conveyance object. At this point, an operator of the conveyance object 50 places the conveyance object 50 onto the top surface of the conveyor tray 52 conveyed in the upstream low-speed section 21 continuing to the location for receiving the conveyance object, introducing the conveyance object 50 to the conveyance path 12. Alternatively, the conveyance object 50 is automatically placed onto the conveyor tray 52 by an automatic transfer device and then is introduced to the conveyance path 12.

<Transfer from the Upstream Low-Speed Section to the First Acceleration Section>

The reference speed of a conveying speed in the first acceleration section 23a of the acceleration section 23 disposed downstream of the upstream low-speed section 21 is equal to the conveying speed of the upstream low-speed section 21. Specifically, when the conveyance object 50 is not located in the first acceleration section 23a, the conveying speed is kept equal (an acceleration of 0) to that of the upstream low-speed section 21 (e.g., 72 m per minute). Thus, the conveyor tray 52 and the conveyance object 50 that have reached the downstream end of the upstream low-speed section 21 can be transferred to the first acceleration section 23a without rapidly changing the speed or acceleration.

<Control of Transfer from the First Acceleration Section to the Second Acceleration Section>

The conveyance object 50 transferred to the first acceleration section 23a is conveyed with the same constant speed as that of the upstream low-speed section 21 for a while. When the arrival sensor 63a detects that the conveyance object 50 has reached the predetermined position near the downstream end of the first acceleration section 23a (the acceleration/deceleration reference positions corresponding to the first acceleration section 23a and the second acceleration section 23b), the controller 70 starts transfer control for transferring the conveyance object 50 from the first acceleration section 23a of the acceleration section 23 (the upstream variable-speed conveyance section) to the second acceleration section 23b (the downstream variable-speed conveyance section).

The second acceleration section 23b has the same reference speed as the first acceleration section 23a. Specifically, when the conveyance object 50 is not located in the second acceleration section 23b, the second acceleration section 23b operates with the same conveying speed as the upstream low-speed section 21. In this case, at the start of transfer control for transfer to the second acceleration section 23b, the controller 70 starts acceleration in the first acceleration section 23a and the second acceleration section 23b with the same constant transfer acceleration (e.g., 1.96 m/s$^2$, see graphs 1 and 2 in FIG. 4). Because of the acceleration in the first acceleration section 23a and the second acceleration section 23b from the same reference speed with the same transfer acceleration, the conveyor tray 52 and the conveyance object 50 arriving at the downstream end of the first acceleration section 23a can be transferred to the second acceleration section 23b without rapidly changing the speed and acceleration. Specifically, in the speed change of FIG. 4, the conveyance object 50 is transferred upstream and downstream with the same conveying speed and a conveyance acceleration kept at 1.96 m/s$^2$ (0.2 G). Moreover, at the start of the acceleration in the first acceleration section 23a, the acceleration is preferably increased gradually to the transfer acceleration in order to avoid an impact applied to the conveyance object 50 by a rapid acceleration change. For the sake of simplification, a gradual change of the acceleration is omitted in FIG. 4.

<Speed Recovery Control of the First Acceleration Section>

Figure 4:
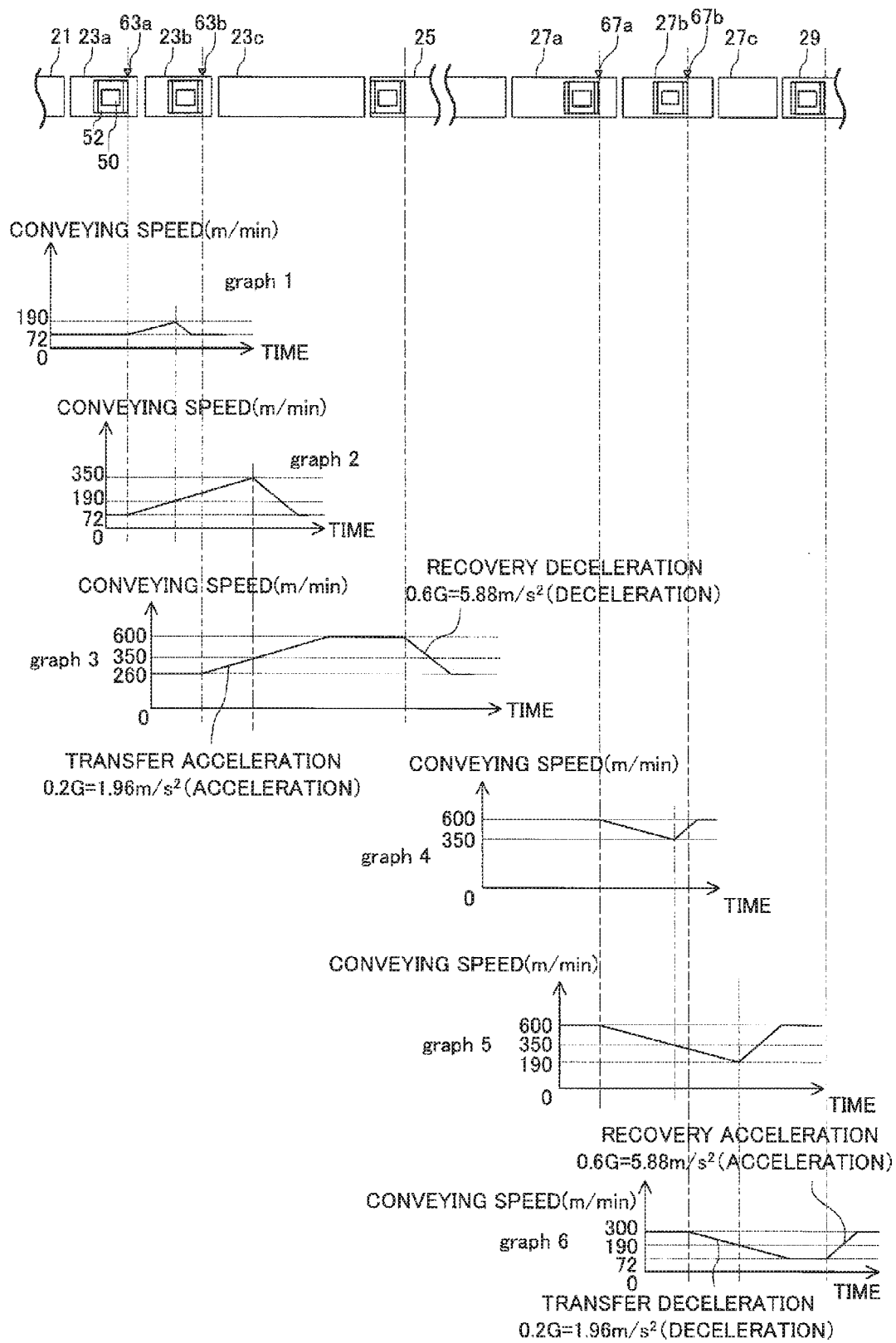
FIG. 4 shows the conveying speed changes of conveyance sections in the conveying apparatus with graphs as the embodiment of the present invention.

When the controller 70 determines that the conveyance object 50 conveyed in the first acceleration section 23a has been completely transferred to the second acceleration section 23b based on a weight detected by the weight sensor 83a of the first acceleration section 23a or the weight sensor 83b of the second acceleration section 23b, the controller 70 starts speed recovery control for returning the conveying speed of the first acceleration section 23a to the reference speed (in FIG. 4, the conveying speed is 190 m per minute upstream and downstream at the start of the speed recovery control).

When speed recovery control for the first acceleration section 23a is started, the controller 70 causes the first acceleration section 23a to perform deceleration with a recovery deceleration (e.g., 0.6 G=5.88 m/s$^2$) having a larger absolute value than the above transfer acceleration. Thus, the conveying speed of the first acceleration section 23a can be returned to the reference speed in a shorter time than a transfer control period (See the graph of FIG. 4). When the conveying speed of the first acceleration section 23a returns to the reference speed, the controller 70 completes the speed recovery control and operates the first acceleration section 23a with the constant reference speed (the same speed as the conveying speed of the upstream low-speed section 21).

<Control of Transfer from the Second Acceleration Section to the Third Acceleration Section>

The conveyance object 50 transferred to the second acceleration section 23b is continuing to be conveyed on the second acceleration section 23b while being accelerated with the transfer acceleration. When the arrival sensor 63a detects that the conveyance object 50 has reached the predetermined position (the acceleration/deceleration reference position corresponding to the third acceleration section 23c) near the downstream end of the second acceleration section 23b, the controller 70 starts transfer control for preparation for reception of the conveyance object 50 from the second acceleration section 23b (the upstream variable-speed conveyance section) to the third acceleration section 23c (the downstream variable-speed conveyance section) of the acceleration section 23.

The third acceleration section 23c operates with the reference speed while the conveyance object 50 is not located in the third acceleration section 23c. The reference speed of the third acceleration section 23c is set equal to the conveying speed of the second acceleration section 23b when the conveyance object 50 reaches the position of the arrival sensor 63a (that is, the acceleration/deceleration reference position corresponding to the third acceleration section 23c) in the second acceleration section 23b. The reference speed of the third acceleration section 23c can be determined beforehand according to the length/reference speed/transfer acceleration of the second acceleration section 23b (e.g., 260 m per minute).

At the start of transfer control for the third acceleration section 23c, the controller 70 starts acceleration of the third acceleration section 23c with the transfer acceleration (e.g., 1.96 m/s$^2$); meanwhile, the controller 70 continues acceleration of the second acceleration section 23b with the transfer acceleration (See graphs 2 and 3 of FIG. 4). The above setting of the reference speed of the third acceleration section 23c allows the upstream second acceleration section 23b and the downstream third acceleration section 23c to be conveyed with the same speed at the start of the transfer control for the third acceleration section 23c. Because of both of the upstream and downstream acceleration with the same transfer acceleration from the same conveying speed, the conveyor tray 52 and the conveyance object 50 arriving at the downstream end of the second acceleration section 23b can be transferred to the third acceleration section 23c without rapidly changing the speed and acceleration. Specifically, in the speed change of FIG. 4, the conveyance object 50 is transferred upstream and downstream with the same conveying speed and a conveyance acceleration kept at 1.96 m/s$^2$ (0.2 G).

<Speed Recovery Control of the Second Acceleration Section>

When the controller 70 determines that the conveyance object 50 conveyed in the second acceleration section 23b has been completely transferred to the third acceleration section 23c based on a weight detected by the weight sensor 83b of the second acceleration section 23b or the weight sensor 83c of the third acceleration section 23c, the controller 70 starts speed recovery control for returning the conveying speed of the second acceleration section 23b to the reference speed (in FIG. 4, the conveying speed is 350 m per minute upstream and downstream at the start of the speed recovery control).

In the speed recovery control for the second acceleration section 23b, the controller 70 allows deceleration of the second acceleration section 23b with a recovery deceleration (e.g., 5.88 m/s$^2$) as in the speed recovery control for the first acceleration section 23a, immediately returns the conveying speed to the reference speed, and then operates the second acceleration section 23b with the constant reference speed (the same speed as the conveying speed of the upstream low-speed section 21, see the graph 2 of FIG. 4).

<Transfer from the Third Acceleration Section to the High-Speed Section>

For the third acceleration section 23c (specifically, the variable-speed conveyance section closest to the high-speed section 25 serving as a downstream constant-speed conveyance section), a target speed is set as a final conveying speed. Specifically, the same speed as the conveying speed (e.g., 600 m per minute) of the high-speed section 25 is set as the target speed. When the conveying speed of the third acceleration section 23c reaches the target speed, the controller 70 completes the acceleration of the third acceleration section 23c and operates the third acceleration section 23c with the constant target speed (that is, the same conveying speed as the high-speed part, see the graph 3 of FIG. 4). At the completion of the acceleration, the acceleration is preferably reduced gradually to 0 in order to avoid an impact applied to the conveyance object 50 by a rapid acceleration change. Moreover, the reference speed, the target speed, the transfer acceleration, and the length of the third acceleration section 23c are desirably set in a proper manner such that the conveying speed can reach the target speed until the conveyance object 50 arrives at the downstream end of the third acceleration section 23c.

The third acceleration section 23c (the upstream conveyance section) arriving at the target speed operates with the same constant conveying speed as the high-speed section 25 (the downstream conveyance section). Thus, the conveyor tray 52 and the conveyance object 50 arriving at the downstream end of the third acceleration section 23c (that is, the downstream end of the acceleration section 23) can be transferred to the high-speed section 25 without rapidly changing the speed and acceleration.

The transfer control for the first, second, and third acceleration sections 23a, 23b, and 23c constituting the acceleration section 23 continuously increases the conveying speed of the conveyance object 50 while the conveyance object 50 is passing through the acceleration section 23, from the conveying speed of the upstream low-speed section 21 (upstream constant-speed conveyance section) to the conveying speed of the high-speed section 25 (downstream constant-speed conveyance section).

<Speed Recovery Control of the Third Acceleration Section>

When the controller 70 determines that the conveyance object 50 conveyed in the third acceleration section 23c has been completely transferred to the high-speed section 25 based on a weight detected by the weight sensor 83c of the third acceleration section 23c or the weight sensor 85 of the high-speed section 25, the controller 70 starts speed recovery control for returning the conveying speed of the third acceleration section 23c to the reference speed.

In the speed recovery control for the third acceleration section 23c, the controller 70 allows deceleration of the third acceleration section 23c with the recovery deceleration so as to immediately return the conveying speed to the reference speed as in the speed recovery control for the second acceleration section 23b, and then the controller 70 operates the third acceleration section 23c with the constant reference speed (See the graph 3 of FIG. 4). However, unlike the first and second acceleration sections 23a and 23b, the reference speed in the third acceleration section 23c is not equal to the conveying speed of the upstream low-speed section 21. Thus, the conveying speed of the third acceleration section 23c approaches the conveying speed of the upstream low-speed section 21 in the speed recovery control but does not decrease to the same value.

<Article Transfer to be Conveyed, Transfer Control, and Speed Recovery Control in the Deceleration Section>

Also in the first, second, and third deceleration sections 27a, 27b, and 27c included in the deceleration section 27, transfer control and speed recovery control are performed as in the acceleration section 23 before and after the transfer of the conveyance object 50 between the conveyance sections. However, the deceleration section 27 undergoes deceleration in transfer control and acceleration in speed recovery control (See the graphs 4, 5, and 6 of FIG. 4). The transfer deceleration and the recovery acceleration of the deceleration section 27 may have the same absolute values as those of the acceleration section 23. In the deceleration section 27, however, the signs of acceleration and deceleration for the acceleration section 23 are reversed for the deceleration section 27. Thus, the transfer deceleration is a change of deceleration (negative value) and the recovery acceleration is a change of acceleration (positive value). The reference speeds of the first and second deceleration sections 27a and 27b are set equal to the conveying speed of the high-speed section 25. Moreover, the target speed of the third deceleration section 27c is set equal to that of the downstream low-speed section 29.

The transfer control of the deceleration sections in the deceleration section 27 continuously reduces the conveying speed of the conveyance object 50 while the conveyance object 50 is passing through the deceleration section 27, from the conveying speed of the high-speed section 25 (upstream constant-speed conveyance section) to the conveying speed of the downstream low-speed section 29 (downstream constant-speed conveyance section).

The downstream low-speed section 29 is connected to a destination (e.g., a loading area near a plane on standby), allowing the conveyance object 50 transferred to the downstream low-speed section 29 to be sent to the destination.

[The Operations of the Variable-Speed Conveyance Sections included in the Acceleration Section and the Deceleration Section]

Figure 5:
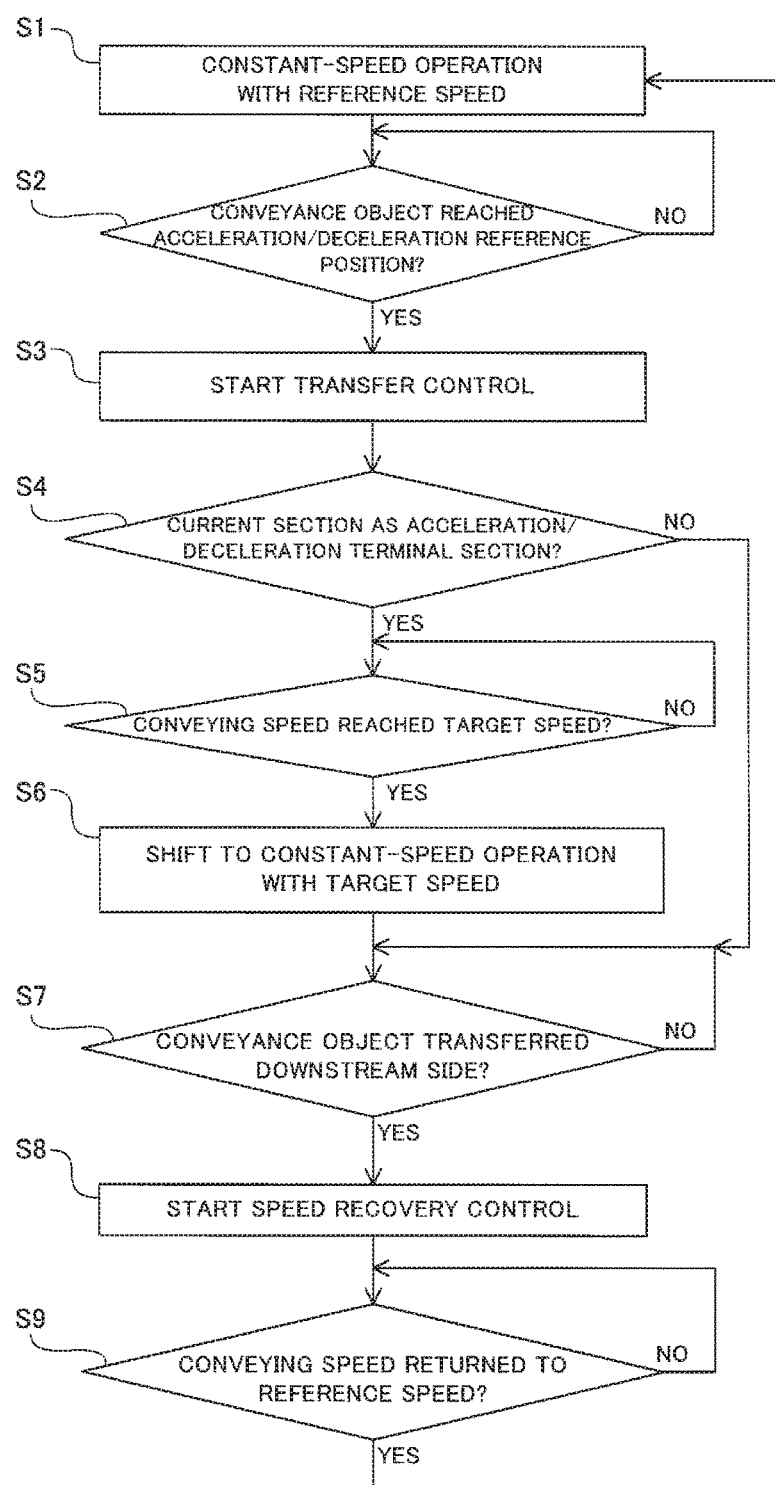
FIG. 5 is a flowchart showing a flow of control in the conveying apparatus as the embodiment of the present invention.
Figure 6:
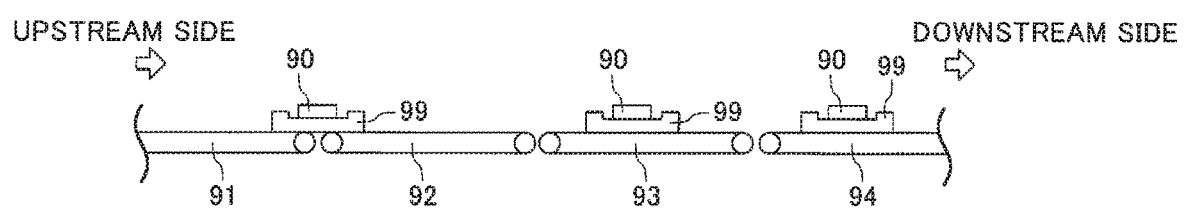
FIG. 6 is a schematic side view showing a conventional conveying apparatus for gradual acceleration/deceleration.

Regarding the operations of the variable-speed conveyance sections 23a, 23b, and 23c of the acceleration section 23 and the variable-speed conveyance sections 27a, 27b, and 27c of the deceleration section 27, the flowchart of FIG. 5 shows the result of focusing the operations of one of the variable-speed conveyance sections.

For example, the result of focusing the operations of the third deceleration section 27c will be discussed below. In step Si of FIG. 5, the third deceleration section 27c (variable-speed conveyance section) operates with the constant reference speed (e.g., 300 m per minute). Based on the signal of the arrival sensor 67b provided at the acceleration/deceleration reference position, the controller 70 periodically (e.g., every 20 ms) confirms whether the conveyance object 50 has reached the acceleration/deceleration reference position (in this case near the downstream end of the second deceleration section 27b) corresponding to the third deceleration section 27c (step S2). If the conveyance object 50 does not reach the acceleration/deceleration reference position, the constant-speed operation is continued.

If the conveyance object 50 reaches the acceleration/deceleration reference position, the transfer control of the third deceleration section 27c is started (step S3). In the transfer control, the conveying speed of the third deceleration section 27c is reduced with a transfer deceleration (e.g., 1.96 m/s$^2$).

During the transfer control, it is confirmed whether the variable-speed conveyance section is a variable-speed conveyance section (acceleration/deceleration terminal section) closest to the downstream constant-speed conveyance section (in this case, the downstream low-speed section 29) (step S4). If the variable-speed conveyance section in the transfer control is not an acceleration/deceleration terminal section, the controller 70 continues acceleration/deceleration until the start of speed recovery control, which will be discussed later (advances to step S7). Since the third deceleration section 27c is an acceleration/deceleration terminal section, the process advances to step S5 to confirm whether the conveying speed has reached the target speed (e.g., 72 m per minute) or not based on the number of revolutions of the motor 89.

If the conveying speed of the third deceleration section 27c reaches the target speed, the controller 70 suspends deceleration and operates the third deceleration section 27c with the constant target speed (step S6). If the deceleration is not rapidly changed to 0 but gradually changed to 0, the target speed confirmed in step S5 may be set at a value close to a desired final speed and then the conveying speed may be controlled to reach the desired final speed when the deceleration is gradually changed to 0.

During the transfer control and after the conveying speed reaches the target speed to shift to a constant-speed operation, it is determined whether the conveyance object 50 has been transferred from the third deceleration section 27c (the target variable-speed conveyance section) to the downstream low-speed section 29 (the downstream conveyance section) based on the signal of the weight sensor 87c or the weight sensor 89 (step S7).

If the conveyance object 50 is transferred to the downstream low-speed section 29, the speed recovery control of the third deceleration section 27c is started (step S8). In the speed recovery control, the conveying speed of the third deceleration section 27c is accelerated with a recovery acceleration (e.g., 5.88 m/s$^2$).

In the subsequent step S9, it is confirmed whether the conveying speed of the third deceleration section 27c has returned to the reference speed. If the conveying speed has returned to the reference speed, the third deceleration section 27c is operated with the constant reference speed (returning to step S1).

The third deceleration section 27c was described as an example. Other variable-speed conveyance sections are basically controlled in the same manner as the third deceleration section 27c except for the settings of the reference speed and the acceleration/deceleration reference positions. Thus, regarding all the conveyance sections, the conveying speed and the conveyance acceleration/deceleration are controlled to be identical between the upstream conveyance section and the downstream conveyance section when the conveyance object 50 is transferred from the upstream conveyance section to the downstream conveyance section thereof (at least one of the conveyance sections is a variable-speed conveyance section or a constant-speed conveyance section). In the variable-speed conveyance section from which the conveyance object has been transferred downstream, the conveying speed immediately returns to the reference speed.

In the above conveying method of the conveying apparatus according to the present embodiment, the conveying speed and the conveyance acceleration/deceleration are controlled to be identical between the upstream and downstream conveyance sections when the conveyance object 50 is transferred between the two conveyance sections. Thus, the speed and acceleration/deceleration of the conveyance object 50 are not rapidly changed, preventing the conveyance object 50 from slipping or receiving an impact on the conveyor tray 52. Moreover, this prevents the conveyor tray 52 from slipping on the belt conveyors so as to prevent abrasion of the belt conveyor belts constituting the conveyance sections or the conveyor tray 52 used for conveyance.

Furthermore, the belt conveyors used in the conveying apparatus according to the present embodiment are commercially available and thus constitute the conveying apparatus with guaranteed operation results and high reliability.

In the acceleration section 23 and the deceleration section 27 (acceleration/deceleration sections), the conveying speed of the conveyance object 50 (the conveyor tray 52 bearing the conveyance object 50) is continuously accelerated or decelerated. Thus, the conveying speed of the conveyance object 50 can reach the target speed through acceleration/deceleration (the conveying speed of the high-speed section 25 is used for the acceleration section 23 while the conveying speed of the downstream low-speed section 29 is used for the deceleration section 27) in a short time at a short distance. This can shorten the lengths of the acceleration section 23 and the deceleration section 27. Accordingly, the constant-speed conveyance sections (the downstream low-speed section 21, the high-speed section 25, and the downstream low-speed section 29) can mostly cover the overall length of the conveyance path 12. The large proportion of the constant-speed conveyance sections with simple mechanisms for constant-speed conveyance can suppress the installation and operation cost of the overall conveyance path 12.

Each of the acceleration section 23 and the deceleration section 27 (acceleration/deceleration sections) includes multiple (three) variable-speed conveyance sections. Even when the conveyance object 50 is conveyed in the acceleration/deceleration sections, the variable-speed section on the extreme upstream end (the first acceleration section 23a or the first deceleration section 27a) can return the conveying speed to that of the adjacent constant-speed conveyance section (the upstream low-speed section 21 or the high-speed section 25) after the conveyance object 50 is conveyed downstream (the second acceleration section 23b or the second deceleration section 27b). Thus, the conveyance object 50 can be conveyed to the acceleration/deceleration section before the completion of the conveyance by the acceleration/deceleration section, leading to high conveyance efficiency. Moreover, the absolute value of the recovery acceleration/deceleration is set larger than the transfer acceleration/deceleration, allowing the variable-speed conveyance sections to immediately return to the reference speed after the conveyance object 50 is conveyed downstream. Thus, the variable-speed conveyance sections can more quickly receive the subsequent article 50 (the same speed as the conveying speed of the adjacent constant-speed conveyance section), improving the conveyance efficiency.

If the conveyance object 50 is passenger's baggage of a plane in the present embodiment, the conveyance objects 50 of various shapes and dimensions are conveyed by the belt conveyors while being loaded (stored) on the conveyor trays 52 having identical shapes. Thus, the various settings of acceleration/deceleration reference positions can be determined beforehand according to the shape of the conveyor tray 52, thereby facilitating the design of the conveying apparatus 10. Moreover, the inverted taper portion 52a at the bottom of the conveyor tray 52 causes the lower part of the conveyor tray 52 to have smaller dimensions than the upper part of the conveyor tray 52 along the conveying direction W. The upper part of the conveyor tray 52 needs to be designed as large as the assumed maximum size of the conveyance object 50 so as to store the conveyance object 50 of various shapes and prevent slipping of the conveyance object 50, whereas the lower part in direct contact with the belt conveyor can have a smaller size than the conveyance object 50. Thus, as shown in FIG. 2, even when the upper part of the conveyor tray 52 is still located in the range of the upstream conveyance section (in this case the first acceleration section 23a), the lower part of the conveyor tray 52 is completely located on the belt conveyor of the downstream conveyance section (in this case the second acceleration section 23b) so as to totally support the weights of the conveyor tray 52 and the conveyance object 50 on the belt conveyor of the second acceleration section 23b. This allows the controller 70 to more quickly determine "completion of transfer" based on the detection signal of the weight sensor 83a or the weight sensor 83b. Thus, the speed recovery control can be started earlier and the variable-speed conveyance section can more quickly return to the reference speed, allowing the acceleration/deceleration section to immediately receive the subsequent article 50. Thus, the conveyance efficiency can be improved.

In the above present embodiment, each of the acceleration section 23 and the deceleration section 27 (acceleration/deceleration section) includes the three variable-speed conveyance sections. The number of variable-speed conveyance sections is not particularly limited and thus each of the acceleration/deceleration sections may include two or at least four variable-speed conveyance sections. The reference speed and the acceleration/deceleration reference position for the variable-speed conveyance sections may be set such that the conveying speed and the conveyance acceleration/deceleration may be controlled to be identical between the upstream and downstream conveyance sections when the conveyance object 50 is transferred between the conveyance sections.

In the above present embodiment, the acceleration/deceleration sections are the acceleration section 23 and the deceleration section 27. Only one of the sections may be provided depending on operation specifications required for the conveying apparatus 10. For example, if the conveyance object 50 may be conveyed to a destination with a high conveying speed in the high-speed section 25, the conveyance path 12 may include the upstream low-speed section 21 to the high-speed section 25. Only the acceleration section 23 may be provided without the deceleration section 27. Alternatively, if the conveyance object 50 needs to be conveyed with a low speed near a destination but may be conveyed with a high speed in a location for loading the conveyance object 50, the conveyance path 12 may include the high-speed section 25 to the downstream low-speed section 29. Only the deceleration section 27 may be provided without the acceleration section 23.

In the present embodiment, the acceleration/deceleration reference positions of the first acceleration section 23a and the second acceleration section 23b are located near the downstream end of the first acceleration section 23a while the acceleration/deceleration reference position of the third acceleration section 23c is located near the downstream end of the second acceleration section 23b. The setting of the acceleration/deceleration reference position is not limited. The acceleration/deceleration reference position of the first acceleration section 23a may be disposed at a different position from that of the second acceleration section 23b. For example, the reference speed of the second acceleration section 23b may be set higher than the reference speed of the first acceleration section 23a, and the acceleration/deceleration reference position of the second acceleration section 23b may be set to be a position in the first acceleration section 23a where a conveying speed of the conveyance object 50 that is conveyed while being accelerated in the first acceleration section 23a reaches the reference speed of the second acceleration section 23b. The acceleration/deceleration reference positions of the first, second, and third acceleration sections 23a, 23b, and 23c may be all located at the same position near the downstream end of the first acceleration section 23a and have the same reference speed. When the conveyance object 50 reaches the acceleration/deceleration reference position near the downstream end of the first acceleration section 23a, the acceleration of the first, second, and third acceleration sections 23a, 23b, and 23c may started with the same transfer acceleration. When the conveyance object 50 is transferred between the conveyance sections, the conveying speed and the acceleration/deceleration may be controlled to be identical between the upstream and downstream conveyance sections regardless of the settings of the reference speed, the acceleration/deceleration reference position, and the transfer acceleration/deceleration. The numerical values of the reference speed and the transfer acceleration/deceleration are merely exemplary in the present embodiment and thus the specific numerical values may be optionally set in consideration of factors including necessary elements for proper transfer control, the number of conveyors installed in the apparatus, the lengths of the conveyors, a required transfer time, and safety. For example, the transfer acceleration/deceleration may be set at 0.3 G (2.94 m/s$^2$) and the recovery acceleration/deceleration may be set at 0.9 G (8.82 m/s$^2$). Alternatively, the transfer acceleration/deceleration may be set at 0.4 G (3.94 m/s$^2$) and the recovery acceleration/deceleration may be set at 1.2 G (11.76 m/s$^2$).

In the above present embodiment, the acceleration/deceleration positions are both located in the acceleration section 23 or the deceleration section 27. The acceleration/deceleration positions may be located in the constant-speed conveyance sections including the upstream low-speed section 21 and the high-speed section 25. For example, the reference speed of the first acceleration section 23a may be set at 0 or lower than that of the constant-speed conveyance in the upstream low-speed section 21, the acceleration/deceleration reference position for starting the acceleration of the first acceleration section 23a may be set at the arrival sensor 61 provided in the upstream low-speed section 21, and the acceleration of the first acceleration section 23a may be controlled to start when the arrival sensor 61 detects arrival of the conveyance object 50. In this case, when the conveying speed of the first acceleration section 23a reaches the conveying speed of the upstream low-speed section 21, the first acceleration section 23a may be shifted to the constant-speed conveyance.

In the above present embodiment, the speed recovery control is started in response to the signal of the weight sensor. The speed recovery control may be started after the conveyance object 50 is conveyed downstream. Thus, the speed recovery control may be started when the arrival sensor provided in the downstream conveyance section detects arrival of the conveyance object 50. For example, the speed recovery control of the first acceleration section 23a may be started when the arrival sensor 63b of the second acceleration section 23b detects arrival of the conveyance object 50. Alternatively, in addition to the acceleration/deceleration reference position, a speed recovery reference position for starting speed recovery control may be set for each of the variable-speed conveyance sections on the conveyance path 12, and speed recovery control may be performed based on the signal of the arrival sensor provided at the speed recovery reference position. For example, the arrival sensor 69 provided in the downstream low-speed section 29 of FIG. 1 may be located at the speed recovery reference position of the third deceleration section 27c, and the speed recovery control of the third deceleration section 27c may be started when the arrival sensor 69 detects arrival of the conveyance object 50.

In the above present embodiment, when the conveyance object 50 reaches the acceleration/deceleration reference position, acceleration/deceleration is started in the variable-speed conveyance section corresponding to the acceleration/deceleration reference position. Acceleration/deceleration may be started relative to a conveying speed instead of the position of the conveyance object 50. For example, during acceleration/deceleration in the upstream variable-speed conveyance section, acceleration/deceleration may be started in the downstream variable-speed conveyance section when the conveying speed of the variable-speed conveyance section reaches the reference speed of the downstream variable-speed conveyance section. Instead of acceleration/deceleration started immediately after the conveyance object 50 reaches the acceleration/deceleration reference position, a timer may be prepared for measuring an elapsed time from the detection of the conveyance object 50 by the arrival sensor, starting acceleration/deceleration after a predetermined time from the detection of arrival. In this case, the acceleration/deceleration reference position may be separated from the corresponding acceleration/deceleration section. For example, the deceleration of the first and second deceleration sections 27a and 27b may be started after a time period required for the passage of the conveyance object 50 through the first deceleration section 27a elapses since the detection of arrival of the conveyance object 50 by the arrival sensor 65 (FIG. 1) provided near the downstream end of the high-speed section 25. Moreover, the timing for starting the speed recovery control may be determined by a timer instead of direct detection of transfer using the weight sensor. For example, after the arrival sensors 63c and 67c detect that the conveyance object 50 is located near the downstream end of the third acceleration section 23c or the third deceleration section 27c, a timer may measure an elapsed time since the conveyance object 50 has moved downward (the high-speed section 25 or the downstream low-speed section 29) to be undetectable (the sensors have been turned off) and then the speed recovery control may be started after a predetermined time since the sensors have been turned off.

In the present embodiment, control in the conveyance path 12 is performed by the single controller 70. The control may be shared by multiple controllers. For example, a controller may be provided for each of the variable-speed sections so as to control motor rotations in the variable-speed section of the controller and perform separately transfer control or speed recovery control for each of the variable-speed sections while communicating with devices required for control, for example, the arrival sensor at the acceleration/deceleration reference position of the variable-speed section or the weight sensor of the upstream/downstream conveyance section.

In the above present embodiment, for the sake of simplification, the upstream low-speed section 21, the high-speed section 25, and the downstream low-speed section 29 that serve as constant-speed conveyance sections are each composed of a single belt conveyor. The constant-speed conveyance section may include multiple conveyors. For example, the high-speed section 25 may include several conveyors arranged in series so as to convey the conveyance object with a constant high speed. In this case, the series of conveyors for conveyance with a constant high speed acts as the high-speed section 25. Furthermore, the conveyor for starting deceleration disposed on the extreme downstream end acts as the first deceleration section 27a.

In the present embodiment, the conveyance section including the belt conveyor may be replaced with another conveyance mechanism such as a roller conveyor as long as the conveyance object 50 can be conveyed. Alternatively, proper one of the conveyor trays 52 of various dimensions and shapes prepared may be selected and used according to the dimensions and shape of the conveyance object 50. Alternatively, the conveyance object 50 may be directly conveyed by the conveyors without using the conveyor tray 52. In this case, if the conveyance object 50 has a small size, the transfer of the conveyance object 50 between the conveyance sections is determined earlier so as to quickly start the speed recovery control. Thus, if many of the conveyance objects 50 have small sizes, the conveyance efficiency of the overall apparatus improves.

Having described the invention, the following is claimed:
1. A conveying apparatus for conveying a conveyance object, the conveying apparatus having a conveyance path along a conveying direction of the conveyance object, the conveyance path including a plurality of conveyance sections provided along the conveying direction, the conveyance object being conveyed through the conveyance path,
wherein at least two of the conveyance sections are constant-speed conveyance sections each of which conveys the conveyance object with a constant conveying speed, each of the constant-speed conveyance sections having its constant conveying speed predetermined corresponding to each of the constant-speed conveyance sections, an upstream constant-speed conveyance section being one of the constant-speed conveyance sections disposed in the upstream side in the conveying direction, a downstream constant-speed conveyance section being another one of the constant-speed conveyance sections disposed in the downstream side in the conveying direction, the upstream constant-speed conveyance section and the downstream constant-speed conveyance section having different conveying speeds from each other,
the conveyance path includes an acceleration/deceleration section between the upstream constant-speed conveyance section and the downstream constant-speed conveyance section, the acceleration/deceleration section including a plurality of variable-speed conveyance sections capable of changing a conveying speed of the conveyance object,
each of the variable-speed conveyance sections included in the acceleration/deceleration section has a conveying speed that is continuously accelerated or decelerated during the conveyance of the conveyance object, while the conveyance object is passing through the entire acceleration/deceleration section, the conveying speed of the conveyance object being accelerated or decelerated from the conveying speed of the upstream constant-speed conveyance section to the conveying speed of the downstream constant-speed conveyance section,
the conveying speed and the conveyance acceleration/deceleration are controlled to be identical between an upstream conveyance section conveying the conveyance object and a downstream conveyance section disposed in the downstream side of the upstream conveyance section when the conveyance object is transferred from the upstream conveyance section to the downstream conveyance section, and
after the conveyance object is conveyed to the downstream conveyance section, a conveying speed of the variable-speed conveyance section disposed in the upstream side is accelerated or decelerated so as to approach a conveying speed of the upstream constant-speed conveyance section.

2. The conveying apparatus according to claim 1, wherein the conveyance path contains acceleration/deceleration reference positions set for the respective variable-speed conveyance sections,
transfer control is performed after the conveyance object reaches the acceleration/deceleration reference position, and
in the transfer control, the variable-speed conveyance section for the acceleration/deceleration reference position has a conveying speed that is accelerated or decelerated with a predetermined transfer acceleration/deceleration.

3. The conveying apparatus according to claim 2, wherein a reference speed is set for each of the variable-speed conveyance sections, and
the reference speed, the acceleration/deceleration reference position, and the transfer acceleration/deceleration are set to satisfy the following condition:
the transfer control is performed such that the conveyance object reaches the acceleration/deceleration reference position and then the conveying speed of the variable-speed conveyance section corresponding to the acceleration/deceleration reference position is accelerated or decelerated with a constant transfer acceleration/deceleration from the reference speed, allowing a conveying speed of the variable-speed conveyance section to be identical to a conveying speed of a conveyance section upstream of the variable-speed conveyance section when the conveyance object reaches the variable-speed conveyance section.

4. The conveying apparatus according to claim 3, wherein when the conveyance object that is conveyed in the variable-speed conveyance section is transferred to a conveyance section downstream of the variable-speed conveyance section, speed recovery control is performed, and
in the speed recovery control, the variable-speed conveyance section has a conveying speed that is accelerated or decelerated to the reference speed with a recovery acceleration/deceleration having an absolute value larger than the transfer acceleration/deceleration.

5. The conveying apparatus according to claim 1, wherein a plurality of containers to be conveyed of uniform shapes are conveyed in the conveyance path by conveyors, and the conveyance object is conveyed while being stored in the container to be conveyed in each of the conveyance sections.

6. The conveying apparatus according to claim 5, wherein the container to be conveyed has an inverted taper portion where dimensions along the conveying direction are extended upward from the bottom of the container.

7. A conveying method for a conveyance object, the conveyance object being conveyed through a conveyance path including a plurality of conveyance sections provided along a conveying direction of the conveyance object,
wherein at least two of the conveyance sections are constant-speed conveyance sections each of which conveys the conveyance object with a predetermined constant conveying speed, the constant-speed conveyance sections including an upstream constant-speed conveyance section disposed in the upstream side and a downstream constant-speed conveyance section disposed in the downstream side in the conveying direction with different conveying speeds,
the conveyance path includes an acceleration/deceleration section between the upstream constant-speed conveyance section and the downstream constant-speed conveyance section, the acceleration/deceleration section including a plurality of variable-speed conveyance sections capable of changing a conveying speed of the conveyance object, and
in each of the variable-speed conveyance sections included in the acceleration/deceleration section, the method comprises:
continuously accelerating or decelerating a conveying speed of the variable-speed conveyance section during the conveyance of the conveyance object so as to accelerate or decelerate the conveying speed of the conveyance object while the conveyance object is passing through the entire acceleration/deceleration section, from the conveying speed of the upstream constant-speed conveyance section to the conveying speed of the downstream constant-speed conveyance section;
controlling the conveying speed and the conveyance acceleration/deceleration to be identical between an upstream conveyance section conveying the conveyance object and a downstream conveyance section disposed in the downstream side of the upstream conveyance section when the conveyance object is transferred from the upstream conveyance section to the downstream conveyance section, and after the conveyance object is conveyed to the downstream conveyance section, accelerating or decelerating a conveying speed of the variable-speed conveyance section disposed in the upstream side so as to approach a conveying speed of the upstream constant-speed conveyance section.

\* \* \* \* \*